United States Patent
Davis

(10) Patent No.: US 10,656,941 B2
(45) Date of Patent: *May 19, 2020

(54) DIAGNOSING PRODUCTION APPLICATIONS

(71) Applicant: MICROSOFT TECHNOLOGY LICENSING, LLC, Redmond, WA (US)

(72) Inventor: Jackson Davis, Snohomish County, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,258

(22) Filed: Jan. 14, 2019

(65) Prior Publication Data

US 2019/0146785 A1 May 16, 2019

Related U.S. Application Data

(63) Continuation of application No. 14/083,157, filed on Nov. 18, 2013, now Pat. No. 10,289,411.

(51) Int. Cl.
*G06F 11/36* (2006.01)
*G06F 11/14* (2006.01)
*G06F 8/75* (2018.01)

(52) U.S. Cl.
CPC .............. *G06F 8/751* (2013.01); *G06F 11/14* (2013.01); *G06F 11/366* (2013.01); *G06F 11/3636* (2013.01); *G06F 11/3644* (2013.01)

(58) Field of Classification Search
None
See application file for complete search history.

(56) References Cited

U.S. PATENT DOCUMENTS

| | | | | |
|---|---|---|---|---|
| 6,202,199 | B1 * | 3/2001 | Wygodny | G06F 11/3636 702/183 |
| 8,209,288 | B2 * | 6/2012 | Friedman | G06F 11/3664 707/638 |
| 2002/0087950 | A1 * | 7/2002 | Brodeur | G06F 11/3636 717/124 |

(Continued)

OTHER PUBLICATIONS

Mario Hewardt et al., Advanced Windows Debugging, Oct. 2007 (Year: 2007).*

(Continued)

*Primary Examiner* — Jae U Jeon
*Assistant Examiner* — Douglas M Slachta
(74) *Attorney, Agent, or Firm* — Workman Nydegger

(57) ABSTRACT

A debugging and diagnostics system allow for dynamic code generation that inserts code into a production application to identify snappoints or breakpoints that cause snapshots to be taken if predefined conditionals are satisfied. The snappoints are associated with locations in source code for the production application and include conditional statements that must be met to create a snapshot of the production application. The snappoints are used to generate a collection plan that is provided to the server running the production application. The server rewrites the code of the production application based upon the collection plan to insert instructions that create snapshots when the conditional statements are met.

15 Claims, 6 Drawing Sheets

(56) References Cited

U.S. PATENT DOCUMENTS

| | | | | |
|---|---|---|---|---|
| 2002/0138788 | A1* | 9/2002 | Yenne | G06F 9/465 714/38.12 |
| 2006/0047715 | A1* | 3/2006 | Parizeau | G06Q 10/087 |
| 2006/0288332 | A1* | 12/2006 | Sagar | G06F 9/526 717/124 |
| 2007/0168997 | A1* | 7/2007 | Tran | G06F 11/3664 717/129 |
| 2008/0134148 | A1* | 6/2008 | Clark | G06F 11/3636 717/128 |
| 2008/0216054 | A1* | 9/2008 | Bates | G06F 11/3636 717/125 |
| 2008/0301717 | A1* | 12/2008 | Chilimbi | G06F 11/3664 719/329 |
| 2009/0307373 | A1* | 12/2009 | Cardone | H04L 67/36 709/238 |
| 2010/0088683 | A1* | 4/2010 | Golender | G06F 9/547 717/128 |
| 2010/0199265 | A1* | 8/2010 | Maybee | G06F 11/3644 717/130 |
| 2012/0317552 | A1* | 12/2012 | Bates | G06F 11/3636 717/129 |
| 2012/0324236 | A1* | 12/2012 | Srivastava | G06F 21/57 713/189 |
| 2013/0036403 | A1* | 2/2013 | Geist | G06F 11/3636 717/125 |
| 2015/0052400 | A1* | 2/2015 | Garrett | G06F 11/3656 714/37 |

OTHER PUBLICATIONS

Lee et al., A Development of Remote Tracepoint Debugger for Run-time Monitoring and Debuggin of Timing Constraints on Qplus-p RTOS, 2003, IEEE (Year: 2003).*

"Revised Summons to Attend Oral Proceedings Issued in European Patent Application No. 15794387.9", Mailed Date: Jul. 24, 2019, 02 Pages.

"Summons to Attend Oral Proceedings Issued in European Patent Application No. 15794387.9", Mailed Date: Jul. 1, 2019, 11 Pages.

"Office Action Issued in European Patent Application No. 15788551.8", dated Dec. 4, 2019, 6 pages.

"Office Action Issued in Brazilian Patent Application No. BR112015002267-7", dated Jan. 13, 2020, 5 pages.

"First Office Action and Search Report Issued in Chinese Patent Application No. 201580056568.8", dated Jan. 15, 2020, 19 pages.

"First Office Action and Search Report Issued in Chinese Patent Application No. 201580059174.8", dated Feb. 3, 2020, 16 pages.

* cited by examiner

DIAGNOSING PRODUCTION APPLICATIONS

CROSS-REFERENCE TO RELATED APPLICATIONS

This application is a continuation of U.S. patent application Ser. No. 14/083,157 filed On Nov. 18, 2013, entitled "DIAGNOSING PRODUCTION APPLICATIONS," which application is expressly incorporated herein by reference in its entirety.

BACKGROUND

Traditional software diagnostic tools, such as debuggers, profilers, and memory diagnostic tools, typically operate on a live, running process or a saved, heavyweight process state, such as a process dump file or historical trace. Live processes provide little or no historical context about how a process reached its current state. Process dump files, while verbose, are extremely heavyweight and time consuming to create and analyze.

Most current state-of-the-art techniques for diagnosing logic problems in applications that are running in a production environment use either trace statements or dynamic tracing. For example, trace statements, such as print debugging, monitor print statements that indicate the flow of execution of a process. Dynamic tracing, such as Microsoft Intellitrace®, gathers data in real-time while holding the production process stopped. Another approach is to enable diagnostic interpretation, such as Microsoft's iDNA. All of these current approaches have drawbacks.

Tracing requires modifying the code if the existing tracing is not sufficient. Such modifications require rebuilding and redeploying the application. For tracing, only the data that the developer actually adds to the trace is visible. Because tracing runs in real time and the thread in question cannot perform real work while data is gathered, trace statements tend to be very small and gather only small bits of information.

Low impact methods, such as tracing and Intellitrace®, are very limited in the data that can be collected because the collection must happen in real-time, which can have a large impact on the target process and may reduce throughput and performance.

Interpreted models, such as Microsoft Corporation's Time Travel Tracing (iDNA), have huge performance impact, which makes them unsuitable for diagnosing problems in production environments.

It is important to non-invasively and non-disruptively collect diagnostic data. In a production environment, the diagnostic tools should have little or no impact on the production process and system. The collection of process state data using existing solutions may affect the process and system in an undesirable manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention allow a user to investigate problems on a server process without stopping the process. A user may identify points in the process code where large amounts of data can be collected under particular conditions. The user may set up points for data collection and define conditions for data collection at each point. Instead of live-debugging the process, the collected data is exported to a file or collection plan that may be uploaded to a server. A monitoring utility consumes the collection plan and injects code that causes snapshots of the process to be created. The monitoring utility modifies the IL (Intermediate Language) for a function under analysis so that a conditional executes and determines when to create the snapshots of the process. The snapshot creates a copy of the entire process, including the memory space, module list, etc., at the time that the conditional is met. The user may then use the snapshot copy to inspect the value of any variable.

Once the snapshots are created, the user may attach a debugger to them and analyze them in a manner similar to a crash dump. Alternatively, a collector process may be used to mine data from the snapshots. By creating multiple snapshots, the user obtains a historical picture of what happened in the process over time. For example, the user may simulate stepping by taking several snapshots at different locations. The user diagnoses the production application by analyzing snapshot to snapshot changes.

Embodiments of the invention allow for dynamic code generation that inserts code into a production application to identify snappoints or breakpoints that cause snapshots to be taken if predefined conditionals are satisfied.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
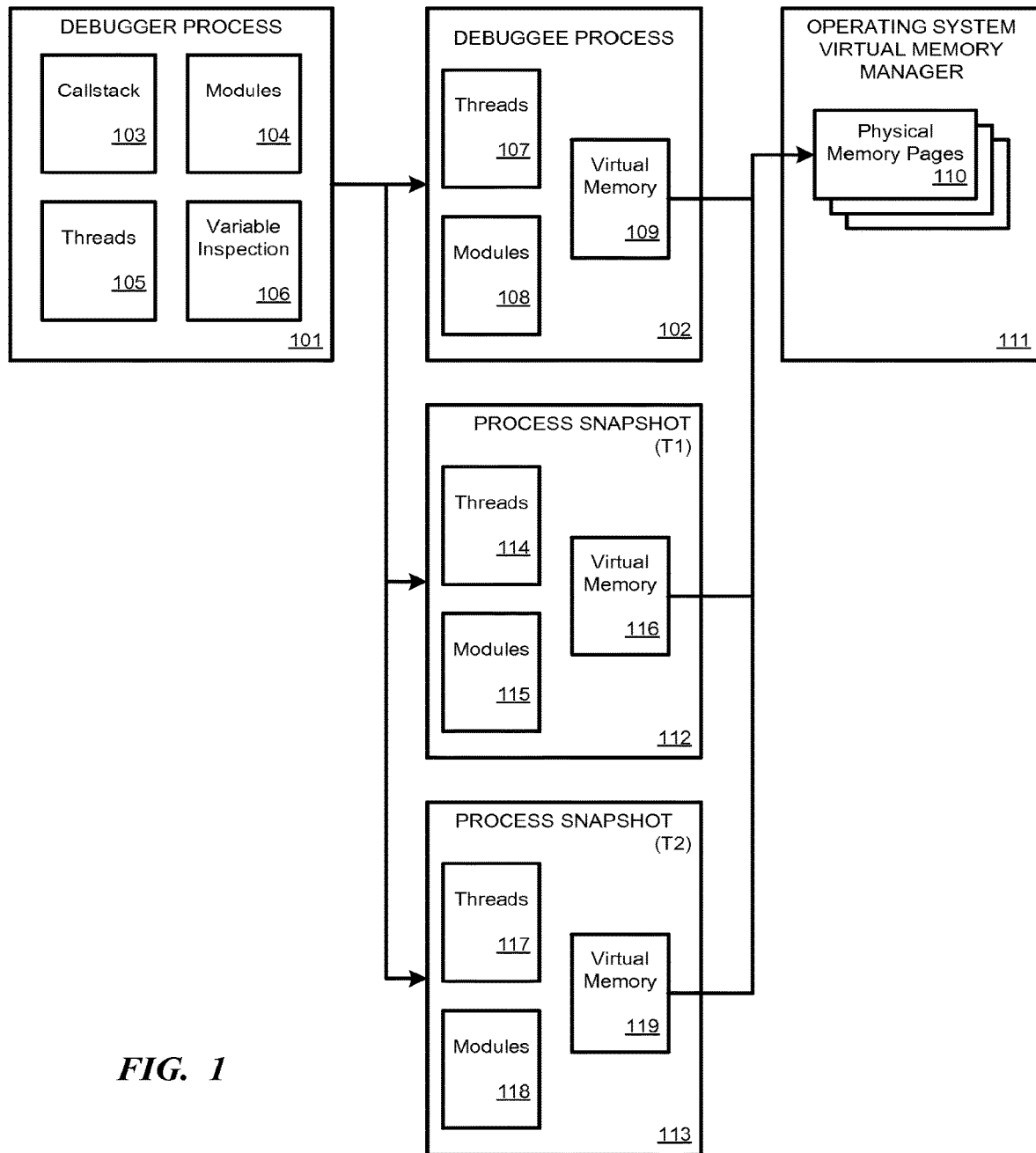
FIG. 1 illustrates historical debugging with snapshots.

Embodiments of the invention enable diagnosing production applications by allowing a developer to define where data should be captured and under what circumstances it should be taken. These diagnostic points are referred to herein as "snappoints". Each snappoint results an entire copy of the process being created in-memory. These copies, which are referred to herein as "snapshots," may be created in one embodiment using an extremely efficient mechanism comprising copy-on-write semantics in the operating system and capturing other small critical data structures, such as the thread list, module list, and thread contexts. Different operating systems may incorporate other mechanisms to create fast copies of processes. Each snapshot takes approximately 10 ms to create. Other snapshot costs are amortized over time as the original process page faults. However, for most applications with normal data locality, the cost of recovering from the page faults is extremely small.

Once a snapshot (or series of snapshots) is created, a diagnostic tool such as a debugger can attach to the snapshots for inspection. Alternatively, a diagnostic collector process can run over the snapshots and call any data it wants. Using the snapshots, collection is not bounded because it is not performed in real-time over a live server process in production.

Using multiple snapshots, a developer can see the state of the application over time exactly as if they were live debugging without impacting the availability of the live production process. Furthermore, using advanced conditions, such as making each snappoint execute for a specifically chosen web-request, the developer can ensure the snappoints are logically related even on a loaded production server handling many web requests at once.

Snapshots are created in cooperation with the operating system on which a target process is running. This allows the snapshot to be created much faster and using fewer system resources than requiring the diagnostic tool to generate the snapshot itself. In one embodiment, the operating system's memory mapping mechanism and copy-on-write are used to map in the address space of the target process to a new snapshot process. The process snapshot may be a clone of the executing process using page table duplication and copy-on-write operations. The process snapshot may be created in other ways, such as by reflecting over the target process or copying memory addresses of the target process.

If the original process is allowed to run, new copies of the memory pages are created as the process writes to each page. This may have some minimal impact to the original process's performance, but it has to create real pages only when one is actually written to.

In some embodiments, a process state may be duplicated by the diagnostic tool. For example, a process snapshot mechanism might not snapshot a module list or thread list, but the diagnostic tool can create snapshots of the module list or thread list quickly and without consuming resources in the way that copying the process heap or stack would require.

The snapshot model enables a mode of historical debugging during a debug session. The snapshots of a debuggee process over time allow a user to view the state of the debuggee process as it existed at the time the snapshot was taken. The user may control when snapshots are taken or the debugger may take the snapshots automatically after some predefined trigger or event. The system's physical and logical resources are the only limit to the number of snapshots that can be created for a process at one time. This makes it possible for a debug session to have multiple snapshots present in the system at once.

FIG. 1 illustrates historical debugging with snapshots. A debugger process 101 is used to debug the debuggee process 102. The debugger process 101 has a user interface that allows the user to analyze components of the debuggee process. For example, the user interface may provide windows showing callstack 103, modules 104, threads 105, and variable inspection 106. The debuggee process 102 comprises, for example, threads 107, modules 108, and a virtual memory page table 109. Virtual memory 109 points to physical memory pages 110 that are managed by the operating system's virtual memory manager 111.

During the debug session, snapshots 112 and 113 are created. These are snapshots of the debuggee process 102 taken at a specific time. The snapshots 112, 113 may be manually initiated by the user, or the debugger 101 may automatically generate the snapshots 112, 113 when a particular event or trigger is observed or at certain intervals.

Snapshot 112 comprises a thread table 114 and modules table 115, which are copies of debugger 101's internal tables at the time (T1) that snapshot 112 was created. Virtual memory page table 116 points to the physical memory pages 110 that were in use at time T1 when snapshot 112 was created. Initially, virtual memory 109 and virtual memory 116 will be identical; however, as debuggee process continues to run virtual memory 109 will change as its page table points to updated memory locations 110.

Similarly, at another time (T2), process snapshot 113 is created in response to a user selection or the occurrence of an event or trigger observed by the debugger process 101. Snapshot 113 includes copies of thread table 117 and modules table 118 at time T2 when the snapshot was created along with a copy of the then-current virtual memory page table 119.

Snapshots 112, 113 allow the debugger process 101 or the user to look back at what debuggee process 102 looked like at the time (T1, T2) when snapshots 112, 113 were created even though debuggee process 102 has changed in the meantime. Also, the debugger process can compare states between and among debuggee process 102 and/or process snapshots 112, 113 to generate differentials between the different process states at different times so that the user can see what part of the process has changed and how.

In other embodiments, a snapshot 112 may be created and the original debuggee process 102 may be allowed to run without interference. Tests may then be run against process snapshot 112 to observe how the process is affected. If process snapshot 112 fails or has other problems due to the tests, then those problems will not affect the real running process 102.

Figure 2:
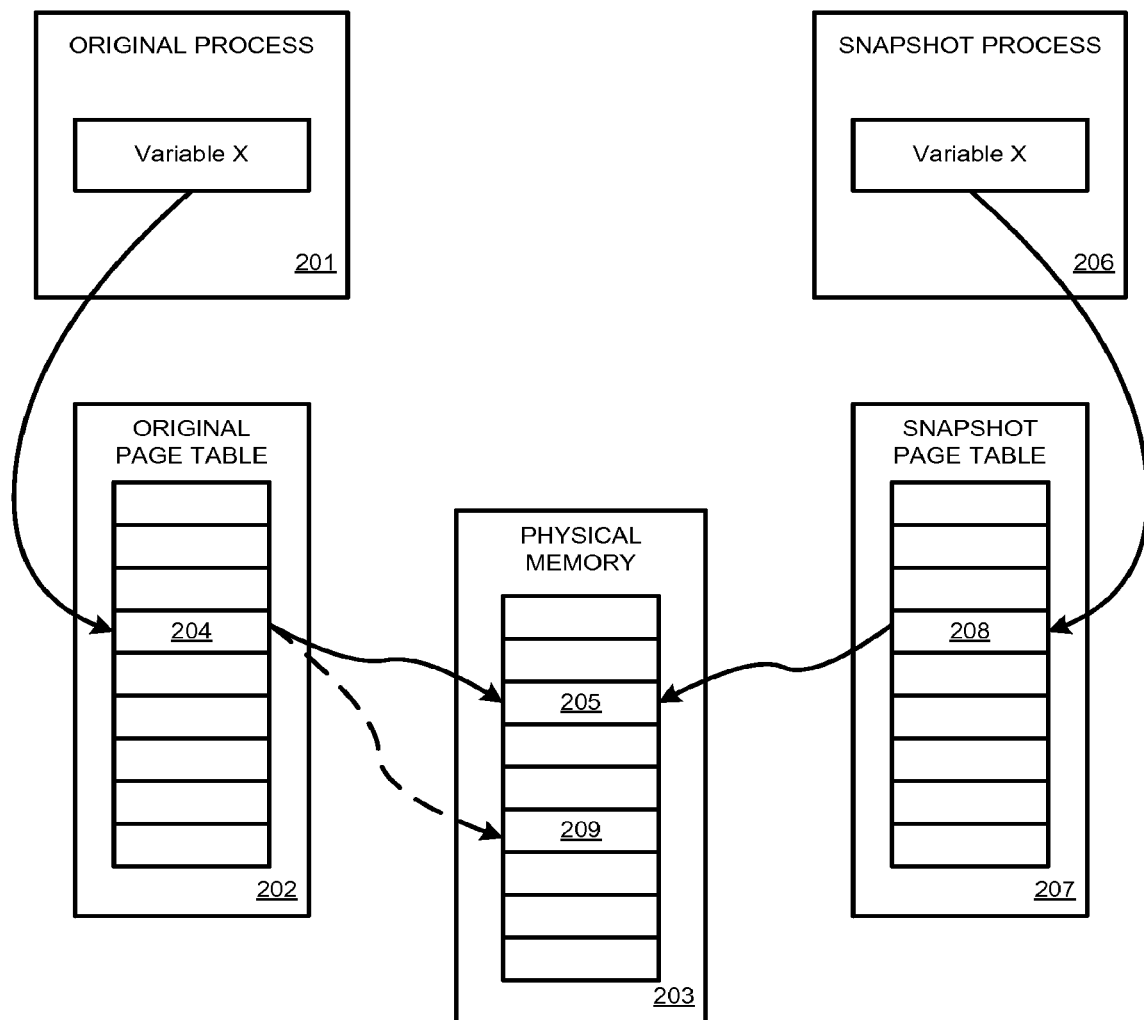
FIG. 2 illustrates a lightweight process snapshot according to one embodiment.

FIG. 2 illustrates a lightweight process snapshot according to one embodiment. Original process 201 includes a page table 202 that points to data stored in physical memory 203. For example, process 201 may store a variable X in page table entry 204, which points to a physical memory location 205 where the value for variable X is actually stored.

When process snapshot 206 is created from original process 201, original page table 202 is copied as snapshot page table 207. The content of snapshot page table 207 is the same as the content of original page table 202 as it existed at the time the snapshot was created. For example, in process snapshot 206, variable X points to an entry 208 in snapshot page table 207, which—like original page table 202—points to physical memory location 205 where the value for variable X is stored.

Original process 201 may continue to run after the snapshot is created. The original process may generate a new value for variable X, which is again stored in entry 204 of original page table 202. However, the new value for variable X is stored in physical memory 203 in a new location 209. Accordingly, original page table 202 is updated to point to physical memory location 209, but snapshot page table 207 maintains its snapshot state and points to memory location 205 where the original value of variable X still resides.

The snapshot mechanism allows for a less destructive debug inspection. Typically when in break mode while debugging a process, the debuggee process is halted by the operating system. This means code within the debuggee process does not execute. This is ideal for inspecting the debuggee state because that state cannot change while the process is halted. However, in some scenarios, halting the process can lead to dead-locks or other system instability. For example, when the debuggee process is shared among other processes, the other processes may attempt to communicate with the shared debuggee process while in break mode. This can lead to delays in other processes in the best case and deadlocks, process corruption, and instability in the worst case. The lightweight snapshot model enables debugging in such scenarios by allowing the debugger to inspect a lightweight process snapshot of the shared process rather than the real process. The real process is allowed to continue execution during this inspection.

Logic errors in production environments may be diagnosed using process snapshots against a production process. This frees the collector from having to run in real-time. A process snapshot uses the operating system's paging system and copy-on-write semantics to create a lightning fast copy of the production process' memory. Once this snapshot is created, a diagnostic collector process can gather data from the snapshot as needed without impacting the production process. The collector process can gather data on its own schedule (i.e., as lazily as desired) from the process snapshot. The initial real-time cost of the snapshot is linearly dependent on the size of the process' page table. The rest of the cost is amortized over time as copy-on-writes occur during the first write to each page.

Because the operating system has limited resources, it is important to control the number of snapshots. Snapshots may be created using, for example, sampling at intervals, adding a "super trace" function, and/or expanding existing Intellitrace® instrumentation points. In another embodiment, a snappoint model is used in which the developer defines where and under what conditions snapshots should be taken. The snappoint model is similar to debugger breakpoints. A developer creates a collection plan by opening a source project for a production application and creating snappoints in the code editor. These snappoints may be defined, for example, on a source-file/line-number pair or may occur when certain data points change. The collection plan is then uploaded to the production server using a production monitoring system.

Once deployed to the production environment, the application in question may be instrumented using IL-rewriting techniques, such as by taking an existing assembly and modifying it at runtime. Each file-line snappoint results in a call to the snapshot API, and each data snappoint results in converting a data field to a property setter that calls the snapshot API.

In other embodiments, it is possible to modify code on a production machine using other techniques in addition to IL-rewriting. For example, if a production application uses non-IL-based code, such as native code, the production application may be modified by injecting raw machine code into the raw native code. Interpreted environments, such as Javascript, may also use the present invention. An interpreter may evaluate the snappoint condition(s), which may be in the matching high-level language. If the interpreted expression evaluates to true, than the interpreter creates the snapshot.

The developer may create complex conditional expressions around the generated snappoint instrumentation to determine under what conditions the snapshot should be created. Examples of possible conditionals would be: conditioning on the number of times a snappoint is hit, creating snappoints when a specific data condition or code path is taken, or choosing a specific "victim" request to the production server, where this request is the only one for which snappoints are created. The last point ensures that a series of snapshots taken over time on a heavily loaded server are logically related to the same web request.

Finally, once the snappoints are created, a collector process runs over them gathering as much data from the process as is needed. Alternatively, the developer may attach a special debugger to one or more snapshots to investigate the problem. The data available to the collector includes all threads, callstacks, registers, and the entire process heap. Since the snappoint is essentially an in-memory dump of the process, the collector can run as a low-priority process minimizing the impact to the production system.

After the snapshots are processed, they are closed and system resources are released. The results of the collector process are serialized into a file format that has a concept of time. The results of multiple snapshots would be contained in this file. This will allow a developer to examine the complete process at each snapshot over time. This file may contain unlimited data for each snappoint.

Figure 3:
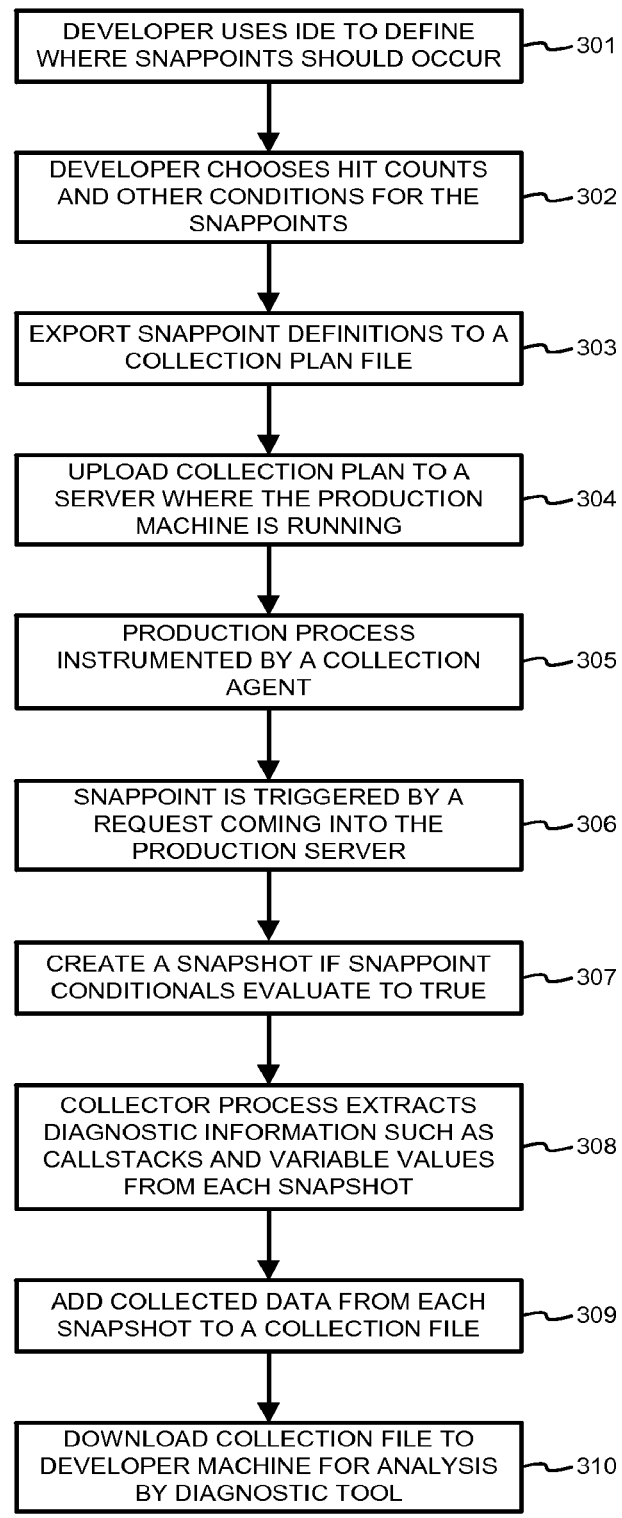
FIG. 3 is a flowchart illustrating diagnostics using a collector process according to one embodiment.

FIG. 3 is a flowchart illustrating diagnostics using a collector process according to one embodiment. When a problem occurs on a server, such as any server that is handling live user requests, a developer may formulate a hypothesis regarding where the problem occurs. Using the method illustrated in FIG. 3 in an iterative manner, the developer can analyze the problem.

In step 301, the developer opens an IDE and defines where snappoints should occur. In step 302, the developer chooses hit count conditions and other conditions for the snappoints. For example, one condition may be that each snappoint is fired on the same web request. In step 303, the snappoint definitions are exported to a collection plan file.

In step 304, the collection plan is uploaded, such as through a cloud portal, to a server where the production process is running. In step 305, the production process is instrumented by a collection agent so that a snapshot API is called at each snappoint.

In step 306, a request comes into the production server and triggers each snappoint. In step 307, each snappoint creates a snapshot if the conditionals defined in step 302 evaluate to true. In step 308, a collector process wakes up and starts extracting diagnostic information, such as callstacks and variable values from each snapshot. In step 309, data collected from each snapshot is added to a collection file representing multiple points in time.

In step 310, the collection file is downloaded to a developer machine where it may be consumed by a diagnostic tool, such as a debugger, that understands multiple time contexts. Based upon the information collected, the developer may formulate a new hypothesis and repeat the process in steps 301-310 to define new snappoints.

Figure 4:
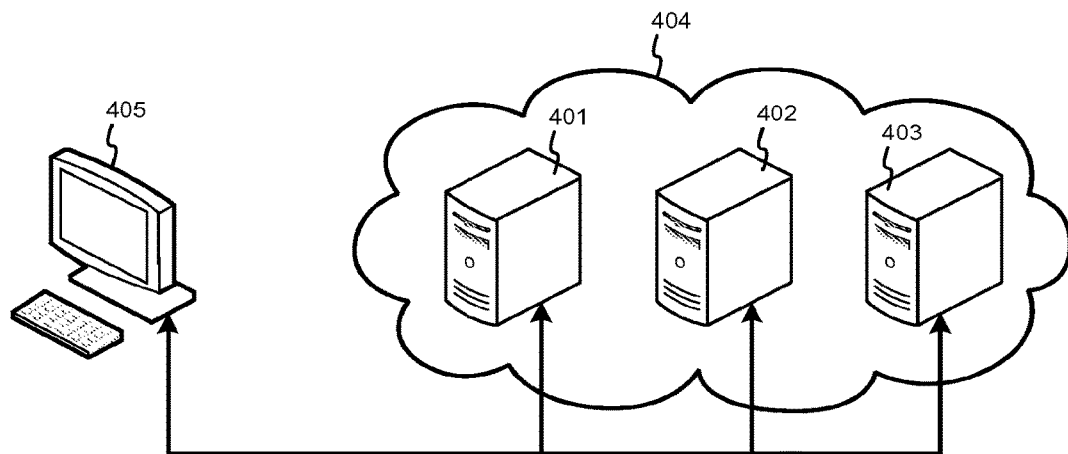
FIG. 4 is a block diagram of a system in which a production application is running on servers in a datacenter or distributed network.

FIG. 4 is a block diagram of a system in which a production application is running on servers 401-403 in a datacenter or distributed network 404, which may be, for example, a cloud-computing environment. A developer may access application code on terminal 405 that is in communication with servers 401-403. In an example embodiment, a large scale web application may be running on servers 401-403 on distribute network 404. Users may report problems with the application to the developer, who is unable to reproduce the errors on a local install of the application running on developer terminal 405. The developer may set snappoints in the production application running on servers 401-403 to collect data to analyze the problem.

The developer may define a hit-count condition to be analyzed within the production application. For example, an IL-rewriting instrumentation engine may be used create a unique identifier for a snappoint, a type of hit-count condition, and a hit count condition target. A function call may be injected into the production application to create a snappoint when the hit-count condition is satisfied.

Figure 5:
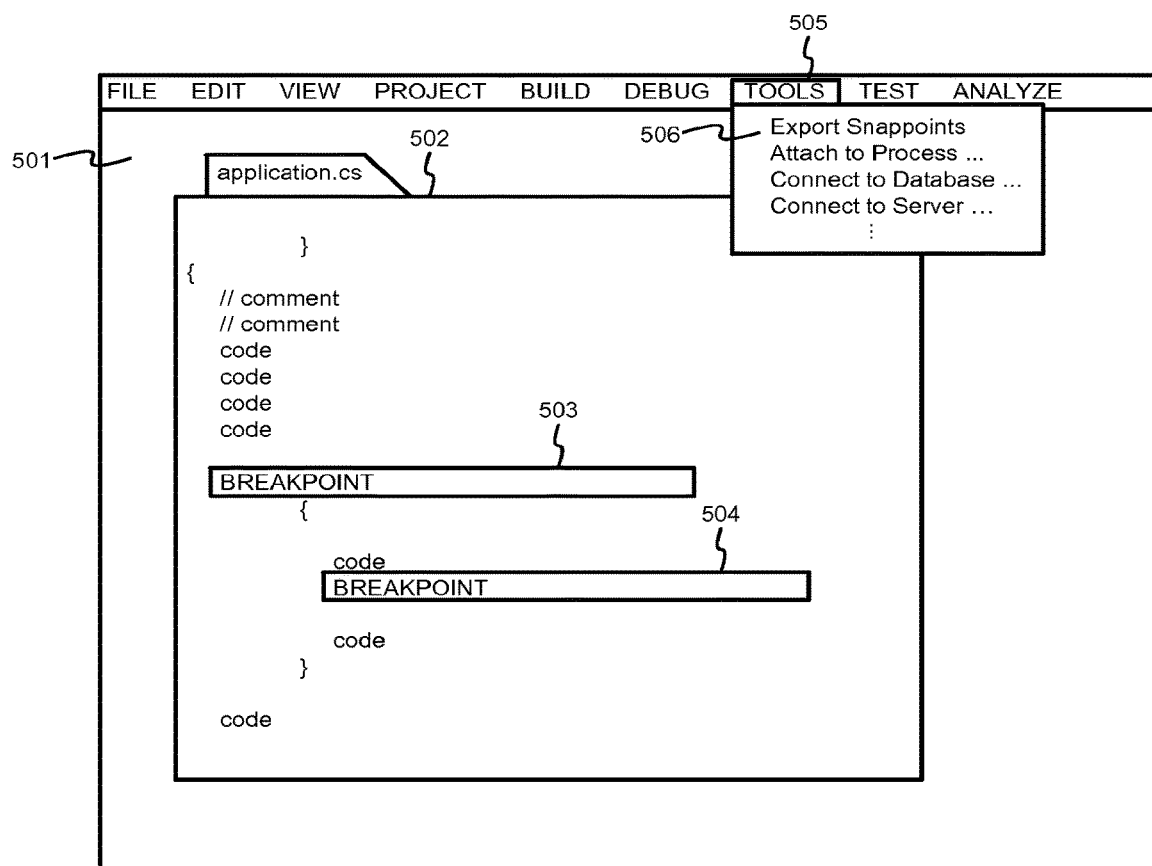
FIG. 5 illustrates an Integrated Development Environment (IDE) in which the developer has opened a project for the application in question.

FIG. 5 illustrates an Integrated Development Environment (IDE) 501 in which the developer has opened a project for the application in question. IDE 501 may be running on a developer terminal 405 (FIG. 4), for example. The IDE 501 displays source code 502 for the application. The developer may set breakpoints 503, 504 at each location in source code 502 where he is interested in seeing what is happening in the production application. The breakpoints 503, 504 correspond to locations in code that the developer would want the program to stop if he was live debugging the problem.

The developer then opens a Tools menu 505 and chooses an Export Snappoints option 506 to create a collection plan. The collection plan may be an XML file that describes the locations in the source code where breakpoint 503, 504 occur and the breakpoint conditions. The XML file contains the information that is needed to inject code into the production process to make a snapshot be created.

Figure 6:
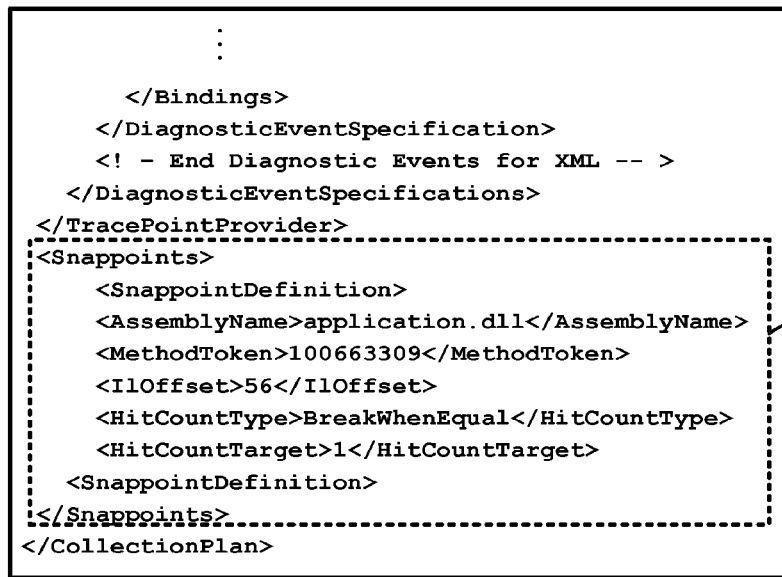
FIG. 6 illustrates an example definition of a snappoint within a collection plan XML file.

FIG. 6 illustrates an example definition of a snappoint 601 within a collection plan XML file 602. The collection plan file 602 may be emitted from the IDE in response to the developer selection the Export Snappoints option 505 (FIG. 5).

XML file 602 contains all of the bound snappoint data. <AssemblyName> identifies the DLL that the snappoint is bound. <MethodToken> defines which function within the DLL the snappoint is bound to. <IlOffset> is the integer offset of the MSIL from the start of the function. <HitCountType> and <HitCountTarget> define the conditions for the snappoint. The snappoint conditions may correspond to the standard conditions that are used in a normal debug breakpoint, such as hit counts, value conditions, etc.

After creating a collection plan 602, the developer enables it on the live process. The developer may publish a new collection plan using an option in the IDE, for example, or use an option in a datacenter portal to upload the collection plan and to enable collection. For example, the developer using terminal 405 (FIG. 4) may use a portal to upload the collection plan 602 to a datacenter or cloud-computing environment 404. The collection plan 602 is then distributed to all machines and servers 401-402 that are running the production application. A process running on those machines and servers consumes the collection plan causes the application code to be rewritten. For example, in the case of CLR, the profiling API causes the code to be rewritten to emit new IL that contains the code for the condition, including the hit count or the variable value, and a new function call that causes the snapshot to be created. It will be understood that this process in not limited to the CLR, but could also be used with other implementations, such as a native implementation, Java, an interpreter, or any implementation that can use a collection plan file to create a new type of breakpoint. As the production server or machine executes the code for each snappoint, a new process snapshot is created if the conditional around that snappoint is satisfied.

The snapshot is created without stopping the production process so that the process users do not know that anything happened or that a snappoint occurred. This allows the developer to create a hypothesis of what is causing a problem in the process, describe the snappoint conditions to analyze that hypothesis, send the collection plan to the process, and then collect data while the users continue to use the process without any performance impact and without stopping the processing.

The process snapshots may be consumed in a number of different ways. In one embodiment, a live debugger may attach to the snapshot, which would give the developer a similar experience as working with a minidump or other on-disk copy of a process. This would allow the debugger to view the entire state of the process at the time of the snapshot. In another embodiment, a collector process is activated when the snapshot is created. The collector process then mines data from the snapshot. The developer would not be required to have access to the machine in this case. Instead, the collection process may mine as much data from the snapshots as necessary and then forward the data to the developer in a separate file. For example, the file may use the historical format available in Intellitrace® that includes data from multiple times. Other file formats that allow multiple snapshots to be collected and serialized to disk may also be used.

Figure 7:
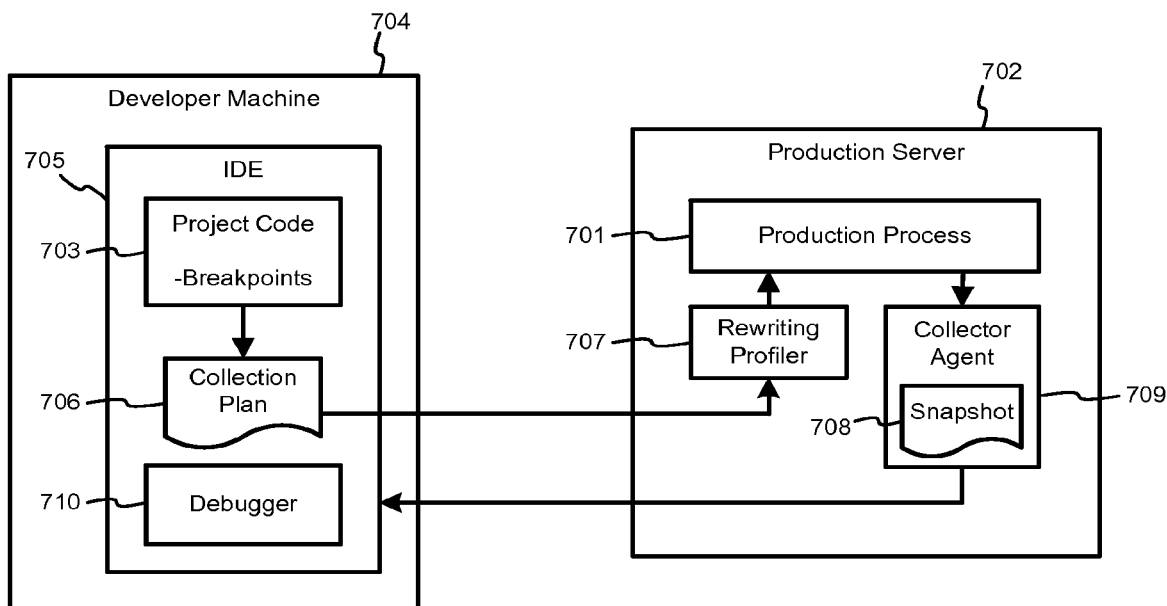
FIG. 7 is a block diagram of a system for analyzing a production process without stopping or impacting the process.

FIG. 7 is a block diagram of a system for analyzing a production process without stopping or impacting the process. The production process 701 is running on a production server 702, which may be deployed in a datacenter or in a cloud-computing environment. Production process 701 corresponds to project code 703 on a developer machine 704. If the developer wants to inspect the operation of production process 701, he accesses project code 703 using IDE 705.

The developer creates breakpoints in project code 703 at locations of interest, such as in sections of the code that the developer hypothesizes are causing user errors. The breakpoints include conditional statements so that they are triggered only under predefined situations. The IDE 705 generates a collection plan 706 that describes the locations in the source code where the breakpoint occur and the breakpoint conditions.

The IDE 705 exports or uploads the collection plan 705 to a rewriting profiler 707 on production server 702. The rewriting profiler emits new code for the production process 701 that includes the conditions defined in the collection plan. The new code is injected into production process 701 and includes new function calls that cause snapshots to be created when the conditions are met.

The production process 701 continues running with the new code, which has be updated without affecting the users. When the conditions defined in the collection plan are met, the snapshot function is called and a snapshot 708 of the process 701 is created and passed to a collector agent 709. The snapshot 708 may be passed to a debugger 710 on the developer machine 704 for further analysis. Alternatively, the collector agent 709 may mine the snapshot for data and then pass the data to IDE 705 for further analysis.

Using this process, redeployment of the production process is not required. This avoids downtime and allows the production process to maintain state without impacting users. The developer receives snapshots 709 corresponding to the breakpoints set in project code 703 and can analyze those snapshots to verify the source of problems or errors that occur in the production process. For example, the developer may define breakpoints that would occur only if their hypothesis is correct. Corresponding snapshots would then allow for further analysis of the process under error conditions.

While the collector agent or debugger mines data from the snapshot, disruption to the original process is minimized. This allows a large number of snapshots to be taken over time to collect specific and abstracted data (as opposed to collecting the entire memory-dump), and allowing trends to be determined easily.

Figure 8:
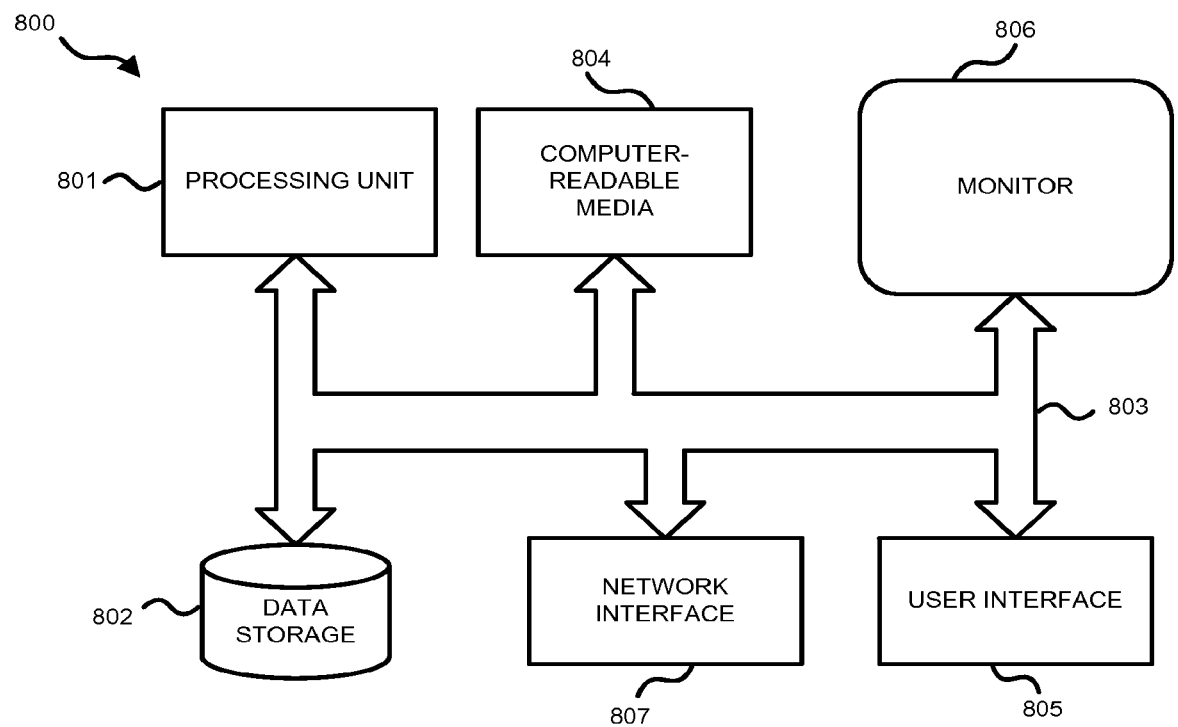
FIG. 8 illustrates an example of a suitable computing and networking environment.

FIG. 8 illustrates an example of a suitable computing and networking environment 800 on which the examples of FIGS. 1-7 may be implemented. The computing system environment 800 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 800. Components may include, but are not limited to, various hardware components, such as processing unit 801, data storage 802, such as a system memory, and system bus 803 that couples various system components including the data storage 802 to the processing unit 801. The system bus 803 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 800 typically includes a variety of computer-readable media 804. Computer-readable media 804 may be any available media that can be accessed by the computer 800 and includes both volatile and nonvolatile media, and removable and non-removable media, but excludes propagated signals. By way of example, and not limitation, computer-readable media 804 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 800. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 802 includes computer storage media in the form of volatile and/or nonvolatile memory such as read only memory (ROM) and random access memory (RAM). A basic input/output system (BIOS), containing the basic routines that help to transfer information between elements within computer 800, such as during start-up, is typically stored in ROM. RAM typically contains data and/or program modules that are immediately accessible to and/or presently being operated on by processing unit 801. By way of example, and not limitation, data storage 802 holds an operating system, application programs, and other program modules and program data.

Data storage 802 may also include other removable/non-removable, volatile/nonvolatile computer storage media. By way of example only, data storage 802 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 8, provide storage of computer-readable instructions, data structures, program modules and other data for the computer 800.

A user may enter commands and information through a user interface 805 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 801 through a user input interface 805 that is coupled to the system bus 803, but may be connected by other interface and bus structures, such as a parallel port, game port or a universal serial bus (USB). A monitor 806 or other type of display device is also connected to the system bus 803 via an interface, such as a video interface. The monitor 806 may also be integrated with a touch-screen panel or the like. Note that the monitor and/or touch screen panel can be physically coupled to a housing in which the computing device 800 is incorporated, such as in a tablet-type personal computer. In addition, computers such as the computing device 800 may also include other peripheral output devices such as speakers and printer, which may be connected through an output peripheral interface or the like.

The computer 800 may operate in a networked or cloud-computing environment using logical connections 807 to one or more remote devices, such as a remote computer. The remote computer may be a personal computer, a server, a router, a network PC, a peer device or other common network node, and typically includes many or all of the elements described above relative to the computer 800. The logical connections depicted in FIG. 8 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 800 may be connected to a public or private network through a network interface or adapter 807. In some embodiments, a modem or other means for establishing communications over the network. The modem, which may be internal or external, may be connected to the system bus 803 via the network interface 807 or other appropriate mechanism. A wireless networking component such as comprising an interface and antenna may be coupled through a suitable device such as an access point or peer computer to a network. In a networked environment, program modules depicted relative to the computer 800, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   modifying an application that is executing on a production server by rewriting intermediate language code for the application to include one or more conditional expressions defining one or more conditions for creating one or more snapshots of the application at one or more locations of one or more possible errors;
   evaluating the one or more conditional expressions in the application during execution of the application;
   creating a snapshot of the application during execution of the application without stopping execution of the application and in a way that avoids downtime while maintaining state when the one or more conditional expressions is evaluated as being true, wherein the snapshot creates an entire copy of all memory pages for the application;
   creating one or more additional snapshots of the application when the evaluation subsequently indicates the one or more conditional expression to be true during execution of the application; and
   collecting and comparing data from the snapshot and the one or more additional snapshots using a diagnostic tool to identify one or more trends.

2. The method of claim 1, wherein the intermediate language is rewritten using a rewriting profiler on the production server and wherein the production server provides user access to the application in a non-debugging environment.

3. The method of claim 1, wherein the rewritten intermediate language code includes one or more breakpoints at the one or more locations.

4. The method of claim 1, wherein the rewritten intermediate language code is defined in a collection plan as a location in the application's source code.

5. The method of claim 1, wherein the intermediate language code for the application is modified using a profiler API on the production server.

6. A computing system comprising:
   one or more processor; and
   one or more storage device having stored computer-executable instructions that are operable, when executed by the one or more processor, to implement a method comprising:
     modifying an application that is executing on a production server by rewriting intermediate language code for the application at one or more corresponding breakpoint locations to include one or more conditional expressions defining one or more conditions for triggering creation of one or more snapshots of the application when the one or more conditions is determined to be satisfied;
     during execution of the application, evaluating the one or more conditional expressions in the application to determine whether the one or more conditions is satisfied for triggering the creation of the one or more snapshots;
     creating the one or more snapshots of the application without stopping execution of the application and in a way that avoids downtime while maintaining state and in response to determining the one or more conditions is satisfied, wherein a separate snapshot is created for each instance the one or more conditions is determined to be satisfied during execution of the application; and
     collecting and comparing data from the one or more snapshots using a diagnostic tool to identify one or more trends.

7. The computing system of claim 6, wherein the intermediate language is rewritten using a rewriting profiler on the production server and wherein the production server provides user access the application in a non-debugging environment.

8. The computing system of claim 6, wherein each snapshot includes a copy of memory pages for the application using a copy-on-write operation.

9. The computing system of claim 6, wherein the rewritten intermediate language code is defined in a collection plan as a location in the application's source code.

10. The computing system of claim 6, wherein the intermediate language code for the application is modified using a profiler API on the production server.

11. A computer program product comprising one or more hardware storage device having stored computer-executable instructions that are operable, when executed by one or more computer processor, to implement a method comprising:
   modifying an application that is executing on a production server by rewriting intermediate language code for the application to include one or more conditional expression defining one or more conditions for creating one or more snapshot of the application at one or more location of one or more possible error;

evaluating the one or more conditional expression in the application during execution of the application;

creating a snapshot of the application without stopping execution of the application and in a way that avoids downtime while maintaining state when it is determined, during execution of the application, the one or more conditional expression is satisfied, wherein the snapshot creates an entire copy of memory pages for the application;

creating one or more additional snapshots of the application when the evaluation subsequently indicates the one or more conditional expression is true during execution of the application; and collecting and comparing data from the snapshot and the one or more additional snapshots using a diagnostic tool to identify one or more trends.

12. The computer program product of claim 11, wherein the intermediate language is rewritten using a rewriting profiler on the production server and wherein the production server provides user access to the application in a non-debugging environment.

13. The computer program product of claim 11, wherein the rewritten intermediate language code includes one or more breakpoint at the one or more location.

14. The computer program product of claim 11, wherein the rewritten intermediate language code is defined in a collection plan as a location in the application's source code.

15. The computer program product of claim 11, wherein the intermediate language code for the application is modified using a profiler API on the production server.

* * * * *